(12) United States Patent
Kosaraju et al.

(10) Patent No.: US 12,030,571 B2
(45) Date of Patent: Jul. 9, 2024

(54) SETTING BRACKET FOR BOLSTER ADJUSTMENT

(71) Applicant: Ford Global Technologies, LLC, Dearborn, MI (US)

(72) Inventors: Chenchiah B. Kosaraju, Farmington Hills, MI (US); Martin Fitzpatrick Frey, Saline, MI (US); William Richard Navas, III, Livonia, MI (US); Douglas P. Heerema, Novi, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 326 days.

(21) Appl. No.: 16/708,530

(22) Filed: Dec. 10, 2019

(65) Prior Publication Data

US 2021/0171140 A1 Jun. 10, 2021

(51) Int. Cl.
*B62D 65/14* (2006.01)
*B60R 99/00* (2009.01)
*F16B 37/04* (2006.01)

(52) U.S. Cl.
CPC .............. *B62D 65/14* (2013.01); *B60R 99/00* (2013.01); *F16B 37/041* (2013.01); *F16B 37/044* (2013.01)

(58) Field of Classification Search
CPC ...... B62D 65/02; B62D 65/04; B62D 65/024; B62D 65/14; B62D 65/16; B60R 13/0206; B60R 99/00; F16B 37/044; F16B 37/041; F16B 37/02; F16B 37/043; F16B 5/0635; F16B 5/0642
USPC ........................................................ 248/554
See application file for complete search history.

(56) References Cited

U.S. PATENT DOCUMENTS

| | | | | |
|---|---|---|---|---|
| 2,168,721 A | * | 8/1939 | Tinnerman | F16B 37/041 24/290 |
| 2,258,845 A | * | 10/1941 | Burke | F16B 37/041 411/172 |
| 2,315,359 A | * | 3/1943 | Tinnerman | F16B 37/041 248/71 |
| 2,346,712 A | * | 4/1944 | Tinnerman | F16B 37/041 248/71 |
| 2,563,976 A | * | 8/1951 | Torosian | F16B 33/002 411/544 |
| 2,719,558 A | * | 10/1955 | Tinnerman | F16B 37/041 411/173 |
| 2,745,458 A | * | 5/1956 | Bedford, Jr. | F16B 37/041 411/107 |
| 2,860,741 A | * | 11/1958 | Flora | F16B 37/041 403/21 |
| 2,883,011 A | * | 4/1959 | Flora | F16B 2/241 403/241 |
| 2,883,228 A | * | 4/1959 | Roberts, Jr. | G09F 3/0323 292/256.71 |
| 3,049,369 A | * | 8/1962 | Trafton | F16B 5/128 403/252 |

(Continued)

FOREIGN PATENT DOCUMENTS

WO 2009071244 A1 6/2009

*Primary Examiner* — Taylor Morris
(74) *Attorney, Agent, or Firm* — Todd W. Dishman; Carlson, Gaskey & Olds, P.C.

(57) ABSTRACT

A locator pin assembly includes a locator pin with a locator portion and a threaded portion and a bracket assembly including a tab portion and a nut portion that receives the threaded portion. A structure includes an opening receiving the locator pin and a slot near the opening that receives the bracket assembly.

14 Claims, 5 Drawing Sheets

(56) References Cited

U.S. PATENT DOCUMENTS

| | | | | |
|---|---|---|---|---|
| 3,118,480 A * | 1/1964 | Kreider | F16B 37/041 | 411/173 |
| 3,616,584 A * | 11/1971 | Sartori et al. | E04F 15/02452 | 52/126.6 |
| 3,713,203 A * | 1/1973 | Fanslow | B60J 5/00 | 29/428 |
| 3,744,068 A * | 7/1973 | Harris | A47C 19/04 | 5/181 |
| 3,980,331 A * | 9/1976 | Kennedy | E05C 17/16 | 292/268 |
| 4,197,906 A * | 4/1980 | Leech | F28F 21/084 | 165/76 |
| 4,554,692 A * | 11/1985 | Whitehead | A47C 19/025 | 248/916 |
| 4,633,789 A * | 1/1987 | Kortering | A47B 17/00 | 108/152 |
| 4,671,552 A * | 6/1987 | Anderson | B60R 19/50 | 293/144 |
| 4,807,935 A * | 2/1989 | King | B60N 2/767 | 297/411.38 |
| 4,828,440 A * | 5/1989 | Anderson | F16B 37/043 | 411/104 |
| 4,830,557 A * | 5/1989 | Harris | F16B 37/044 | 411/112 |
| 4,850,633 A * | 7/1989 | Emery | B60R 13/01 | 296/39.2 |
| 4,858,351 A * | 8/1989 | Sewell | F16B 21/16 | 40/712 |
| 4,861,182 A * | 8/1989 | Gillet | F16B 37/043 | 403/264 |
| 5,059,074 A * | 10/1991 | Guevarra | F16B 37/041 | 411/107 |
| 5,100,188 A * | 3/1992 | Stieg | B60K 11/08 | 180/68.6 |
| 5,114,203 A * | 5/1992 | Carnes | B60R 13/00 | 296/191 |
| 5,172,882 A * | 12/1992 | Nini | B60N 2/0705 | 248/430 |
| 5,193,643 A * | 3/1993 | Mcintyre | B60G 99/00 | 180/312 |
| 5,407,310 A * | 4/1995 | Kassouni | B29C 70/76 | 29/525.02 |
| 5,423,646 A * | 6/1995 | Gagnon | F16B 37/041 | 411/174 |
| 5,605,353 A * | 2/1997 | Moss | B62D 21/09 | 188/376 |
| 5,713,707 A * | 2/1998 | Gagnon | F16B 37/041 | 411/112 |
| 5,779,299 A * | 7/1998 | Purcell | B60J 7/145 | 16/DIG. 33 |
| 5,851,045 A * | 12/1998 | Muramatsu | B60J 10/30 | 296/96.21 |
| 5,893,599 A * | 4/1999 | Strohfeldt | B60R 9/00 | 296/37.6 |
| 5,951,223 A * | 9/1999 | Lindquist | F16B 37/02 | 411/175 |
| 6,062,602 A * | 5/2000 | Biesinger | B60R 11/00 | 180/311 |
| 6,146,071 A * | 11/2000 | Norkus | F16B 37/044 | 296/187.09 |
| 6,196,624 B1 * | 3/2001 | Bierjon | B62D 25/084 | 180/68.4 |
| 6,209,946 B1 * | 4/2001 | Eng | B62D 25/04 | 296/146.15 |
| 6,270,051 B1 * | 8/2001 | Power | B60K 5/12 | 248/634 |
| 6,270,152 B1 * | 8/2001 | Sato | B62D 21/11 | 296/192 |
| 6,669,274 B2 * | 12/2003 | Barnard | B60R 19/52 | 296/193.1 |
| 6,854,213 B2 * | 2/2005 | Galliani | B60J 1/17 | 49/375 |
| 6,923,496 B1 * | 8/2005 | Pleet | B60R 19/48 | 180/69.22 |
| 6,935,823 B2 * | 8/2005 | Mitts | F16B 37/061 | 411/111 |
| 7,086,688 B2 * | 8/2006 | Edwards | B62D 25/087 | 296/181.3 |
| 7,188,892 B2 * | 3/2007 | Tazaki | B62D 25/084 | 296/193.09 |
| 7,367,602 B1 * | 5/2008 | Gidcumb, Jr. | B60R 7/04 | 296/24.34 |
| 7,431,384 B2 | 10/2008 | Kapadia et al. | | |
| 7,699,374 B2 * | 4/2010 | Pilette | F16B 19/002 | 296/29 |
| 7,784,857 B2 * | 8/2010 | Naik | F16B 21/09 | 296/193.1 |
| 7,798,563 B2 * | 9/2010 | Kapadia | B62D 25/082 | 296/193.05 |
| 7,861,339 B2 * | 1/2011 | Harrow | A47C 19/005 | 5/201 |
| 8,419,099 B2 * | 4/2013 | Inoue | B60J 5/107 | 296/1.08 |
| 8,794,646 B1 * | 8/2014 | Onishi | B62D 21/155 | 280/124.109 |
| 8,827,588 B2 * | 9/2014 | Inaba | F16B 5/0657 | 403/408.1 |
| 8,925,991 B2 * | 1/2015 | Caliskan | B62D 27/065 | 296/29 |
| 8,985,924 B2 * | 3/2015 | Nakamura | B60N 2/42709 | 411/104 |
| 8,998,300 B2 | 4/2015 | Lanard et al. | | |
| 9,618,078 B2 * | 4/2017 | Kondo | F16F 1/36 | |
| 9,718,508 B2 * | 8/2017 | Criaud | B62D 25/082 | |
| 9,868,475 B2 * | 1/2018 | Miyamoto | B62D 29/005 | |
| 9,908,483 B2 * | 3/2018 | Horneck | B60R 13/0206 | |
| 9,908,574 B2 * | 3/2018 | Salamon | B60R 19/24 | |
| 10,059,380 B1 * | 8/2018 | Feist | B62D 21/00 | |
| 10,144,458 B2 * | 12/2018 | Wilhelm | B62D 27/065 | |
| 10,843,640 B2 * | 11/2020 | Marchlewski | F16B 5/065 | |
| 2004/0096290 A1 * | 5/2004 | Birnbaum | A47B 57/425 | 411/172 |
| 2004/0256832 A1 * | 12/2004 | Bradsen | B60R 3/002 | 280/163 |
| 2007/0280804 A1 * | 12/2007 | Selle | F16B 21/065 | 411/520 |
| 2010/0243835 A1 * | 9/2010 | Tan Chin Yaw | H01R 13/631 | 248/220.21 |
| 2011/0169295 A1 * | 7/2011 | Huelke | F16B 5/0628 | 296/97.11 |
| 2012/0003034 A1 * | 1/2012 | Inaba | F16B 5/0657 | 403/220 |
| 2013/0020822 A1 * | 1/2013 | Inoue | B60J 5/107 | 296/1.08 |
| 2013/0270868 A1 * | 10/2013 | Tejero Salinero | B62D 65/02 | 296/191 |
| 2014/0086704 A1 * | 3/2014 | Hemingway | B29C 64/124 | 411/392 |
| 2015/0021956 A1 * | 1/2015 | Courtright | B62D 25/082 | 296/203.03 |
| 2016/0059898 A1 * | 3/2016 | MacKay | B62D 25/12 | 403/165 |
| 2017/0197668 A1 * | 7/2017 | Miyamoto | B62D 29/005 | |
| 2018/0112704 A1 * | 4/2018 | Siler | F16B 5/02 | |
| 2018/0172060 A1 * | 6/2018 | Nakao | F16B 37/061 | |
| 2018/0186417 A1 * | 7/2018 | Carroll | B60Q 1/0441 | |
| 2019/0084498 A1 * | 3/2019 | Dominguez Cuevas | B60J 5/0469 | |
| 2019/0143799 A1 * | 5/2019 | Murakami | B60K 5/1208 | 248/638 |
| 2019/0309790 A1 * | 10/2019 | Preuss | F16B 35/02 | |

* cited by examiner

SETTING BRACKET FOR BOLSTER ADJUSTMENT

TECHNICAL FIELD

This disclosure relates to a locator pin assembly for setting a relative position between frame members of a motor vehicle.

BACKGROUND

Vehicle frame members and structures are assembled within set tolerances. Assemblies can include a locator pin to set the desired position between structural members and fasteners utilized to secure components. The position of the locator pin is set relative to a reference point. The position of the reference point may vary and therefore a position of the locator pin may also need to vary to compensate for variations within manufacturing tolerances.

SUMMARY

A locator pin assembly according to an exemplary aspect of the present disclosure includes, among other things, a locator pin including a locator portion and a threaded portion, a bracket assembly including a tab portion and a nut portion that receives the threaded portion, and a structure including an opening receiving the locator pin and a slot near the opening that receives the bracket assembly.

In a further non-limiting embodiment of the foregoing locator pin assembly, the opening in the structure is larger than the threaded portion of the locator pin to enable movement of the locator pin to set a desired position.

In a further non-limiting embodiment of any of the foregoing locator pin assemblies, the locator portion is larger than the opening.

In a further non-limiting embodiment of any of the foregoing locator pin assemblies, the tab portion is wider than the slot to prevent the entire bracket assembly from entering the slot.

In a further non-limiting embodiment of any of the foregoing locator pin assemblies, an end portion supports the nut portion and extends from the tab portion.

In a further non-limiting embodiment of any of the foregoing locator pin assemblies, the bracket assembly is a single integrally formed part.

In a further non-limiting embodiment of any of the foregoing locator pin assemblies, the end portion and tab portion are an integrally formed part and the nut portion is attached to the end portion.

In a further non-limiting embodiment of any of the foregoing locator pin assemblies, the slot includes sides that limit rotation of the bracket assembly.

In a further non-limiting embodiment of any of the foregoing locator pin assemblies, the opening is disposed on a locator surface of the structure and the slot is spaced vertically and horizontally from the locator surface.

In a further non-limiting embodiment of any of the foregoing locator pin assemblies, a fastener opening is disposed on the locator surface proximate the opening.

A vehicle frame assembly according to an exemplary aspect of the present disclosure includes, among other things, a first frame member including an opening and a slot, a locator pin received within the opening, the locator pin including a locating portion and a threaded portion and a bracket assembly including a tab portion and a nut portion, the nut portion received into the slot and the nut portion receives the threaded portion of the locator pin.

In a further non-limiting embodiment of the foregoing vehicle frame assembly, the opening is formed on a locating surface, the locating surface defining a first plane and the slot is spaced apart from the first plane.

In a further non-limiting embodiment of any of the foregoing vehicle frame assemblies, the opening is larger than the threaded portion of the locator pin to enable movement of the locator pin relative to the first frame member to set a desired position.

In a further non-limiting embodiment of the foregoing vehicle frame assemblies, the tab portion is wider than the slot to prevent the entire bracket assembly from entering the slot.

In a further non-limiting embodiment of the foregoing vehicle frame assemblies, a second frame member includes a locator opening receiving the location portion of the locator pin for orientating the second frame member relative to the first frame member.

A method assembling a vehicle frame assembly according to another exemplary aspect of the present disclosure includes, among other things, inserting a bracket assembly including a nut portion through a slot within a first frame member to align the nut portion with an opening defined in the first member and threading a threaded portion of a locator pin through the opening and into the nut portion such that the locator pin is movable within the opening.

A further non-limiting embodiment of the foregoing method includes including holding a tab portion of the bracket assembly to position the nut portion into alignment with the opening.

A further non-limiting embodiment of any of the foregoing methods includes assembling a template onto the locator pin that moves the locator pin to a desired position within the opening and tightening the locator pin to the nut portion to secure and hold the locating pin in the desired position.

A further non-limiting embodiment of any of the foregoing methods includes limiting rotation of the bracket assembly while tightening the locator pin with sides of the slot.

A further non-limiting embodiment of any of the foregoing methods includes removing the template and assembling a second frame member to the first frame member by inserting the locating pin onto a locator opening of the second frame member to define a relative position between the first frame member and the second frame member.

The various features and advantages of this disclosure will become apparent to those skilled in the art from the following detailed description. The drawings that accompany the detailed description can be briefly described as follows.

DETAILED DESCRIPTION

Figure 1:
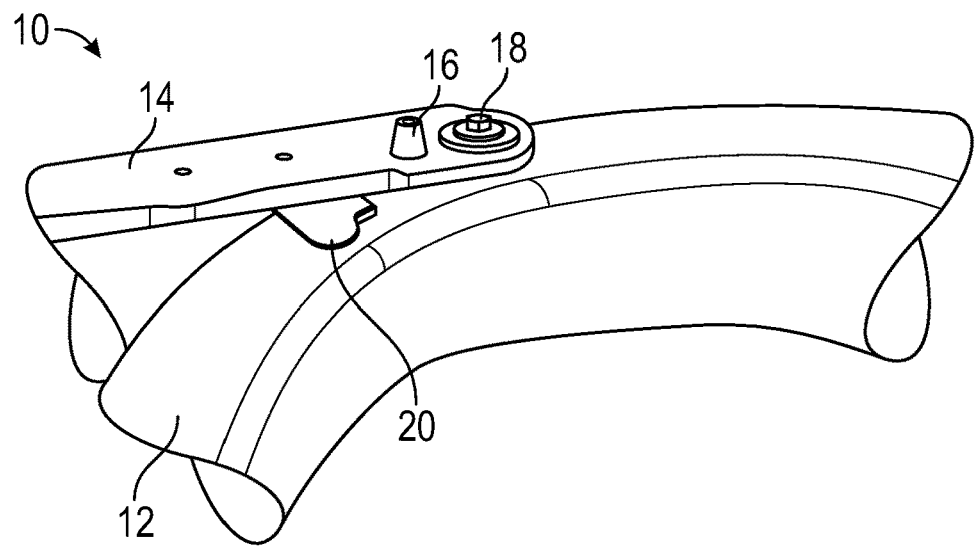
FIG. 1 is a perspective view of an example frame assembly embodiment.
Figure 2:
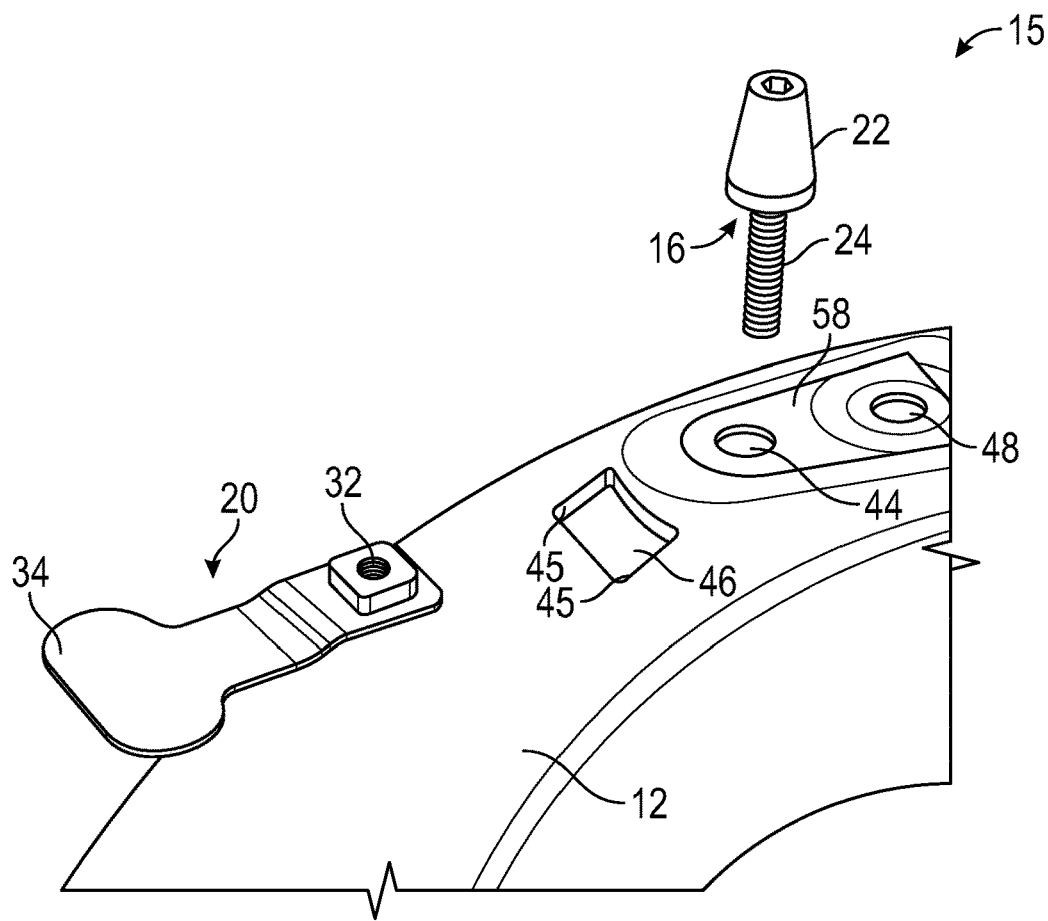
FIG. 2 is a perspective view of an example locator pin assembly.
Figure 3:
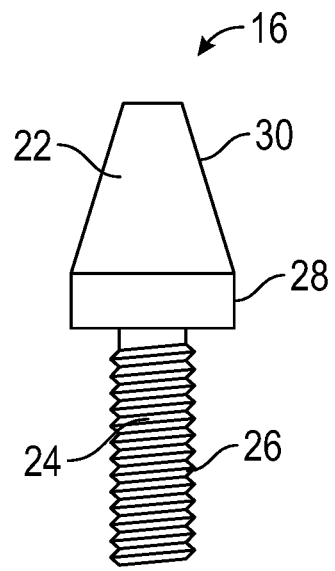
FIG. 3 is a side view of an example locator pin.

Referring to FIG. 1, an example vehicle frame assembly 10 includes a first frame member 12 and a second frame member 14. The example second frame member 14 is a bolster and is positioned relative to the first frame member 12 by a locator pin 16. The locator pin 16 defines a reference point to orientate the second frame member 14 relative to the first frame member 12 according to a predefined tolerance. The locator pin 16 extends through a locating opening within the second member 14 within an established tolerance. A fastener 18 is included to secure the second member 14 to the first member 12.

A position of the example locator pin 16 is adjustable to establish a predefined orientation between the first member 12 and the second member 14 to accommodate variations in manufacturing processes. The locator pin 16 is attached to a bracket assembly 20 that enables one-sided assembly and positional adjustment of the locator pin 16. It should be appreciated, that although a frame member 12 and a bolster 14 are disclosed by way of example, any structure and/or frame members that are attached in a relative orientation to each other and a reference point would benefit from and is within the scope and contemplation of this disclosure.

Referring to FIGS. 2, 3, 4 and 5, an example locator pin assembly 15 includes the locator pin 16, the bracket 20 and features within the first frame member 12. The features within the first frame member 12 include a slot 46 for the bracket 20 and an opening 44 for the locator pin 16. The locator pin 16 is fastened within the opening 44 of the first frame member 12. The bracket 20 includes a nut portion 32 and a tab portion 34. The locator pin 16 includes a threaded portion 24 and a locating portion 22. The threaded portion 24 is engaged to the nut portion 32 to hold the locator pin 16 in place on the first frame member 12.

The bracket 20 is inserted through the slot 46 to align the nut portion 32 with the threaded portion 24 of the locator pin 16. The tab 34 enables an operator to hold and align the nut portion 32 within the frame member 12 relative to the opening 44 without reaching into a cavity 68 of the frame member 12.

The locating portion 22 of the locating pin includes a tapered surface 30 that is received within a locating opening of a second frame member. A width 28 of the locating portion 22 is greater than a width 64 of the opening 44. Accordingly, the locating portion 22 is secured against the locating surface surrounding the opening 44. A width 26 of the threaded portion 26 is less than that of the opening 44 to enable movement of the locator pin 16 in two dimensions.

The tab portion 34 of the bracket 20 includes a width 40 that is greater than a width 62 of the slot 46. The larger width 40 of the tab portion 34 prevents the bracket 20 from sliding entirely into the inner cavity 68 of the first member 12. An end portion 36 of the bracket 20 supports the nut portion 32 and has a width 38. The width 38 is less than the width 62 of the slot 46 to enable some relative side to side movement within the slot 46.

Figure 4:
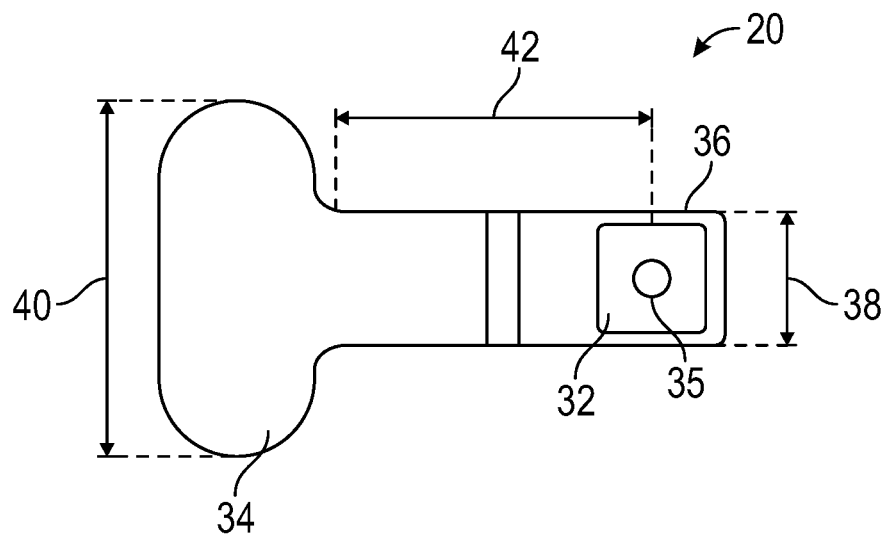
FIG. 4 is a top view of an example bracket assembly embodiment.
Figure 5:
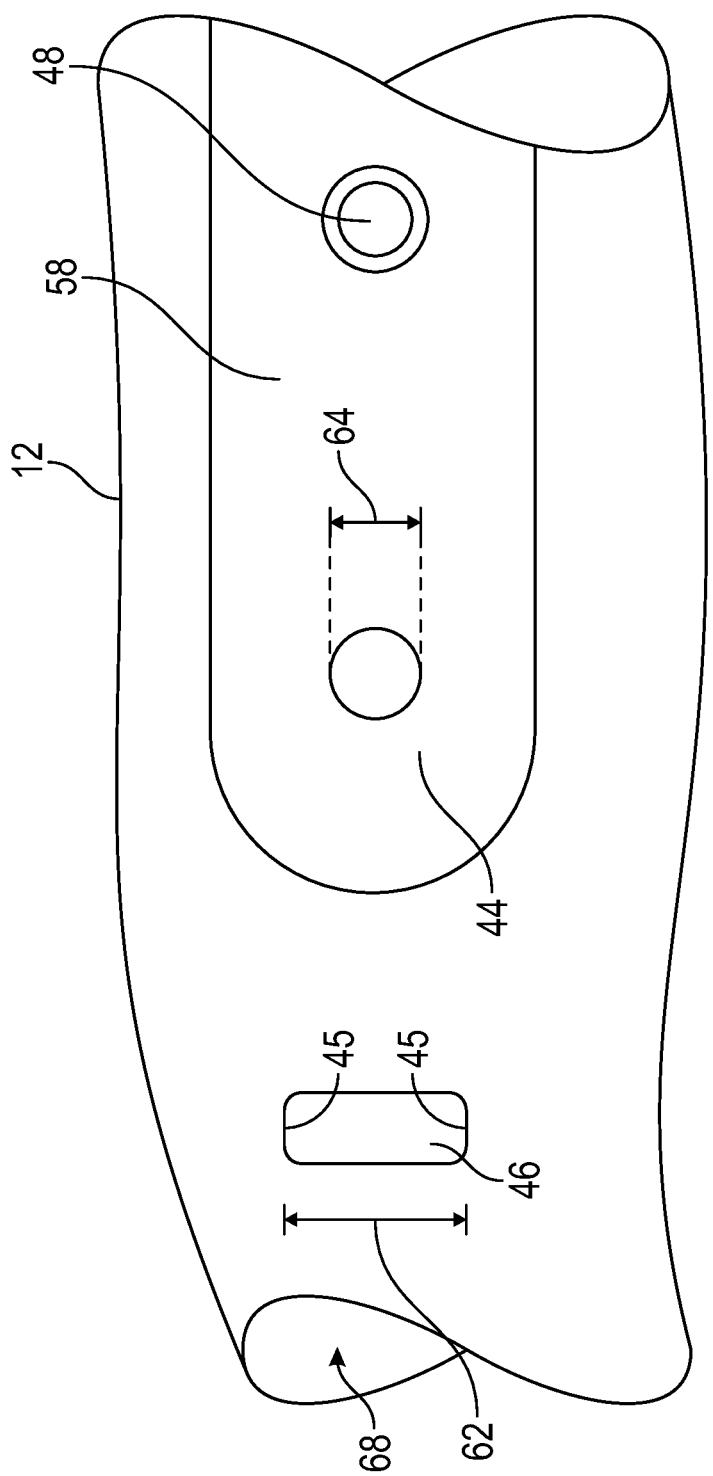
FIG. 5 is a top view of a portion of an example frame member.
Figure 6:
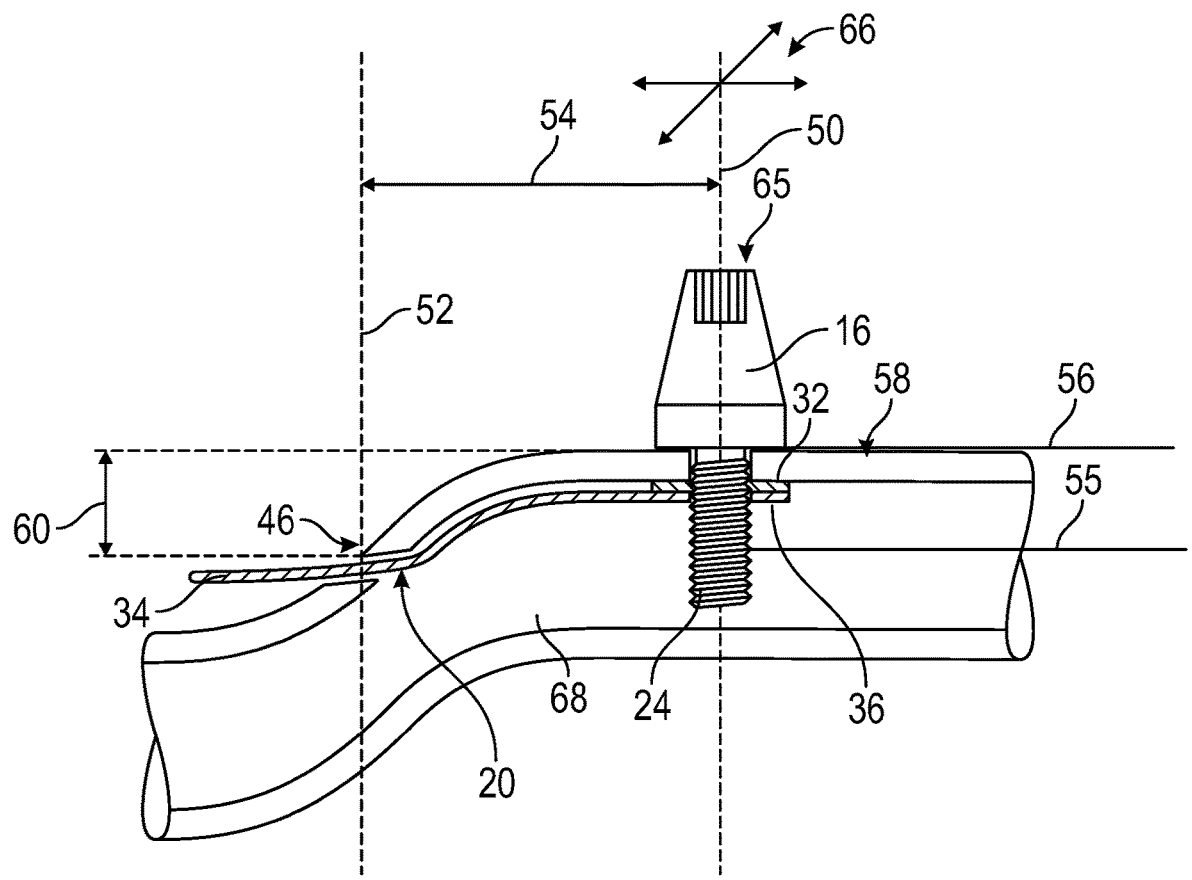
FIG. 6 is a cross-sectional view of the example locator pin assembly.

Referring to FIG. 6 with continued reference to FIG. 4, an opening 35 of the nut portion 32 is spaced a distance 42 from the beginning of the tab 34. The distance 42 is larger than a distance 54 between a centerline 50 of the opening 44 and a vertical centerline 52 through the slot 46. The distance 42 and distance 54 are sized to place the nut portion 32 in an orientation aligned with the opening 44 to enable assembly of the locator pin 16 to the nut portion 32. Moreover, the bracket 20 along the distance 44 will contact sides 45 of the slot 46 to limit rotation of the nut portion 32 relative to the locator pin 16.

In one disclosed embodiment, the nut portion 32, end portion 36 and tab portion 34 are one single unitary part. In another disclosed embodiment, the bracket 20 includes the tab portion 34 and the end portion as a single part with the nut portion 32 attached to the end portion. The bracket 20 remains as part of the completed assembly one the second member 14 is positioned and attached to the first frame member 12.

The opening 44 and fastener opening 48 are arranged on a locating surface 58 of the first frame member 12. The locating surface 58 is disposed within a horizontal plane 56. The slot 46 is located along a horizontal plane 55 that is spaced a vertical distance 60 from the horizontal plane 56. The slot 46 is therefore spaced both vertically and horizontally apart from the opening 44 on the locating surface 58.

Figure 7:
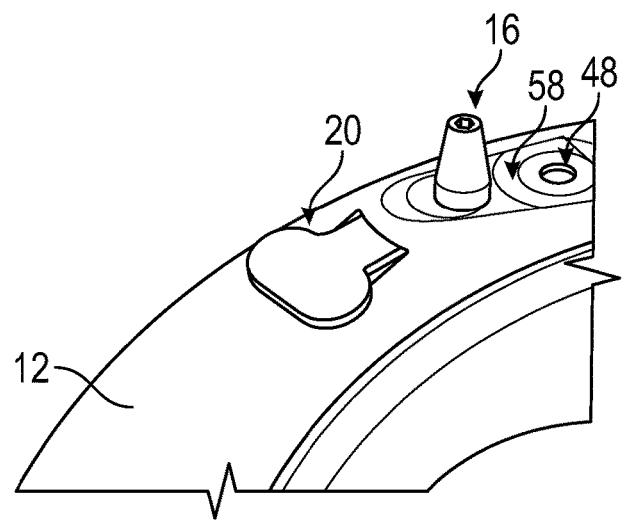
FIG. 7 is a perspective view of the example locator pin assembly.

Referring to FIG. 7 with continued reference to FIG. 6, the locator pin 16 is shown in an initial assembly position. In the initial assembly position, the locator pin 16 is threaded onto the nut portion 32 but not tightened. The bracket assembly 20 is assembled through the slot 46 with the tab portion 34 extending outward and the end portion 36 extended into the inner cavity 68 of the frame member 12.

In the initial assembly position, the locator pin 16 is movable in X and Y directions about the centerline 50 as is schematically shown at 66. The initial engagement between the locator pin 16 and the nut portion 32 allows for adjustment to compensate for manufacturing tolerances.

A master template is assembled over the locating pin to set a position that establishes a reference point for attachment of the second member 14. The locator pin 16 includes a tool interface 65 for engagement with a tool to tighten the locator pin 16 once set to a desired position.

Figure 8:
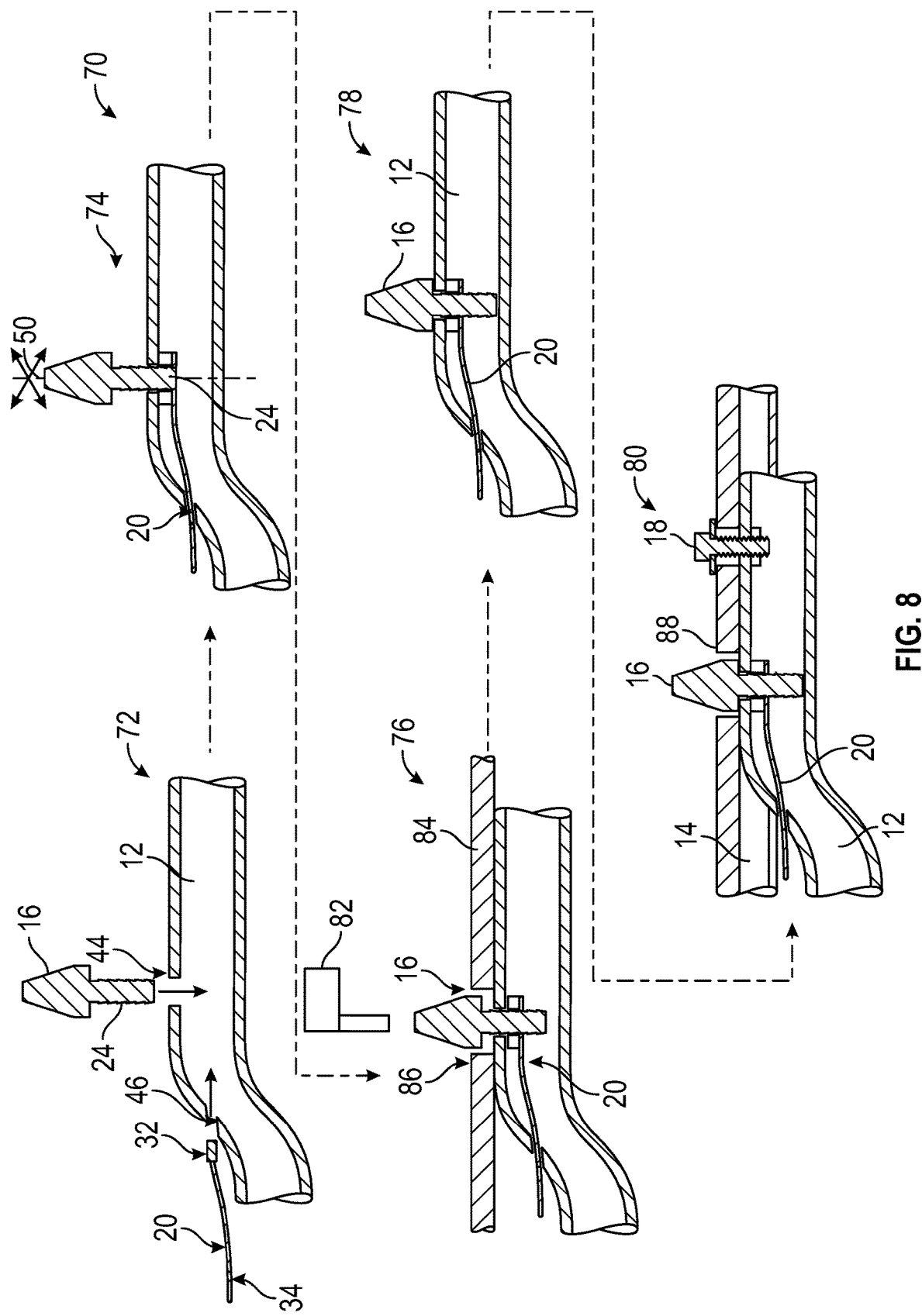
FIG. 8 is a schematic view of an example method of assembling a vehicle frame.

Referring to FIG. 8, a method of assembling a vehicle frame assembly 10 is schematically shown and generally indicated at 70. According to a disclosed method, assembly begins by inserting the bracket 20 into the slot 46 to align the nut portion 32 with the opening 44 as indicated at 72. Alignment is performed by hand with an operator grasping the bracket 20 at the tab portion 34 and inserting the end portion with the nut portion 32 into alignment with the opening 44. The locator pin 16 is then inserted through the opening 44 and threaded to the nut portion 32.

Both the alignment of the bracket 20 and threading of the locator pin 16 are accomplished from a common side of the frame member 12. In this example, both are accomplished from a top side of the frame member 12. The bracket 20 eliminates the need to reach from a different side or into a cavity of the frame member 12.

The locator pin 16 is hand tightened to a point where the locator pin 16 is secured to the frame member 12, but may also be moved relative to the opening 44 as is shown at 74. Initial assembly of the locator pin 16 to the bracket 20 can be performed well before any other steps assembly steps are performed. As appreciated, the locator pin 16 may be assembled to the frame 12 as part of a sub-assembly at a location different from subsequent and final assembly operations.

The locator pin 16 is movable and therefore upon assembly of a master template 84 as indicated at 76, the locator pin 16 will move to a set position. The master template 84 includes an opening 86 that receives the locator pin 16. The master template 84 will include another side and/or feature that engages with another or several reference features to set a desired position. The locator pin 16 will move within the opening 44 based on the position set by the master template 84.

Once the desired location is set, a tool 82 is used to tighten the locator pin 16 in place. The locator pin 16 is tightened to a predefined torque to hold the locator pin 16 in place during final assembly. Once tightened, the master template 84 is removed as indicated at 78 and the frame member 12 is moved to a final assembly.

At final assembly indicated at 80, a second frame member 14 is located onto the first frame member 12 by aligning a locating opening 88 onto the locator pin 16. A fastener 18 is then used to secure the second frame member 14 to the first frame member 12 within the desired relative orientation.

Accordingly, the example locator pin assembly 15 provides for one-sided assembly and adjustment to compensate for variations within manufacturing tolerances.

Although the different non-limiting embodiments are illustrated as having specific components or steps, the embodiments of this disclosure are not just a material specification and are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure. A worker of ordinary skill in the art would understand that certain modifications could come within the scope of this disclosure. For these reasons, the following claims should be studied to determine the true scope and content of this disclosure.

What is claimed is:

1. A locator pin assembly comprising:
a locator pin including a locating portion and a threaded portion, wherein the locating portion includes a tapered surface that decreases in width in a direction away from a maximum width, the tapered surface configured to be received within an opening of a frame member;
a bracket assembly including a tab portion and a nut portion that receives the threaded portion; and
a structure including an opening receiving the locator pin and a slot near the opening that receives a portion of the bracket assembly, wherein the opening and the slot are defined on a common surface of the structure and the locator pin is secured to the common surface of the structure through an engagement between the threaded portion and the nut portion.

2. The locator pin assembly as recited in claim 1, wherein the opening in the structure is larger than the threaded portion of the locator pin to enable movement of the locator pin to set a desired position.

3. The locator pin assembly as recited in claim 2, wherein the maximum width of the locating portion is larger than the opening.

4. The locator pin assembly as recited in claim 1, wherein the tab portion is wider than the slot to prevent the entire bracket assembly from entering the slot.

5. The locator pin assembly as recited in claim 4, including an end portion supporting the nut portion and extending from the tab portion.

6. The locator pin assembly as recited in claim 5, wherein the bracket assembly is a single integrally formed part.

7. The locator pin assembly as recited in claim 5, wherein the end portion and tab portion are an integrally formed part and the nut portion is attached to the end portion.

8. The locator pin assembly as recited in claim 4, wherein the slot includes sides that limit rotation of the bracket assembly.

9. The locator pin assembly as recited in claim 1, wherein the common surface includes a locator surface portion and the opening is disposed on the locator surface portion of the structure and the slot is spaced vertically and horizontally from the locator surface portion.

10. The locator pin assembly as recited in claim 9, including a fastener opening disposed on the locator surface proximate the opening.

11. A vehicle frame assembly comprising:
a first frame member including an opening and a slot disposed on a common surface;
a locator pin received within the opening, the locator pin including a locating portion and a threaded portion, wherein the locating portion includes a tapered surface that decreases in width in a direction away from a maximum width, the tapered surface configured to be received within a locator opening of a second frame member for orientating the second frame member relative to the first frame member; and
a bracket assembly including a tab portion and a nut portion, the nut portion received into the slot and the nut portion receives the threaded portion of the locator pin to secure the locator pin to the common surface.

12. The vehicle frame assembly as recited in claim 11, wherein the common surface includes a locating surface portion with the opening formed on the locating surface portion, the locating surface portion defining a first plane and the slot is spaced apart from the first plane.

13. The vehicle frame assembly as recited in claim 12, wherein the opening is larger than the threaded portion of the locator pin to enable movement of the locator pin relative to the first frame member to set a desired position.

14. The vehicle frame assembly as recited in claim 13, wherein the tab portion is wider than the slot to prevent the entire bracket assembly from entering the slot.

* * * * *